(12) United States Patent
Clare et al.

(10) Patent No.: US 9,346,621 B2
(45) Date of Patent: May 24, 2016

(54) APPARATUS AND METHOD FOR TRANSFERRING SPRINGS

(71) Applicant: Harrison Spinks Components Limited, Leeds, West Yorkshire (GB)

(72) Inventors: David Clare, Barnsley (GB); Simon Paul Spinks, Cawood (GB); Michael Gallagher, Leeds (GB)

(73) Assignee: Harrison Spinks Components Limited, Leeds, West Yorkshire (GB)

( * ) Notice: Subject to any disclaimer, the term of this patent is extended or adjusted under 35 U.S.C. 154(b) by 0 days.

(21) Appl. No.: 14/420,691

(22) PCT Filed: Aug. 8, 2013

(86) PCT No.: PCT/GB2013/052130
§ 371 (c)(1),
(2) Date: Feb. 10, 2015

(87) PCT Pub. No.: WO2014/023974
PCT Pub. Date: Feb. 13, 2014

(65) Prior Publication Data
US 2015/0232277 A1    Aug. 20, 2015

(30) Foreign Application Priority Data
Aug. 10, 2012 (GB) .................................. 1214314.5

(51) Int. Cl.
*B65G 17/46* (2006.01)
*B65G 15/58* (2006.01)
*B68G 9/00* (2006.01)

(52) U.S. Cl.
CPC . *B65G 15/58* (2013.01); *B68G 9/00* (2013.01)

(58) Field of Classification Search
CPC ........ B65G 17/46; B65G 23/18; B65G 47/84; B68G 9/00

USPC ........................................................ 198/690.1
See application file for complete search history.

(56) References Cited

U.S. PATENT DOCUMENTS 2,716,308 A * 8/1955 Hodges, Jr. ..................... 227/21
5,501,317 A   3/1996 Sommer et al.
(Continued)

FOREIGN PATENT DOCUMENTS

CN   2903019 Y    5/2007
CN   201890767 U  7/2011
(Continued)

OTHER PUBLICATIONS

Search Report issued by the British Intellectual Property Office in related British Patent App. No. 1214314.5 on Nov. 9, 2012 (4 pages).
(Continued)

*Primary Examiner* — James R Bidwell
(74) *Attorney, Agent, or Firm* — Gesmer Updegrove LLP

(57) ABSTRACT

A spring transfer apparatus, shown generally at 10, is positioned adjacent a spring coiling machine 12 (shown only schematically). The transfer apparatus comprises a conveying substrate in the form of a belt 14 arranged in an endless loop and driven in a direction A by a motor 16. The belt comprises a plurality of magnetic spring holders 18 which are arranged in use to accept steel wire springs 20 from the coiling machine 12. Each of the magnetic spring holders has a pair of ferromagnets 18a for holding the steel springs. The magnets are arranged such that identical poles are adjacent. The apparatus is arranged such that the magnets begin to attract the formed springs before they are cut from the length of wire by the spring coiling machine.

17 Claims, 4 Drawing Sheets

(56) References Cited

U.S. PATENT DOCUMENTS

| | | | |
|---|---|---|---|
| 6,049,959 A * | 4/2000 | Grondahl | 29/91.1 |
| 6,922,895 B1 | 8/2005 | Whitworth | |
| 2006/0272928 A1 * | 12/2006 | Kritzinger | 198/690.1 |

FOREIGN PATENT DOCUMENTS

| | | |
|---|---|---|
| DE | 19529911 A1 | 2/1997 |
| EP | 0359035 A1 | 3/1990 |
| FR | 2561620 A1 | 9/1985 |
| FR | 2606756 A1 | 5/1988 |
| GB | 947298 A1 | 1/1964 |
| WO | 9635637 A1 | 11/1996 |

OTHER PUBLICATIONS

Search Report and Written Opinion issued by International Searching Authority in related International Patent App. No. PCT/GB2013/052130 on Nov. 27, 2013 (8 pages).

* cited by examiner

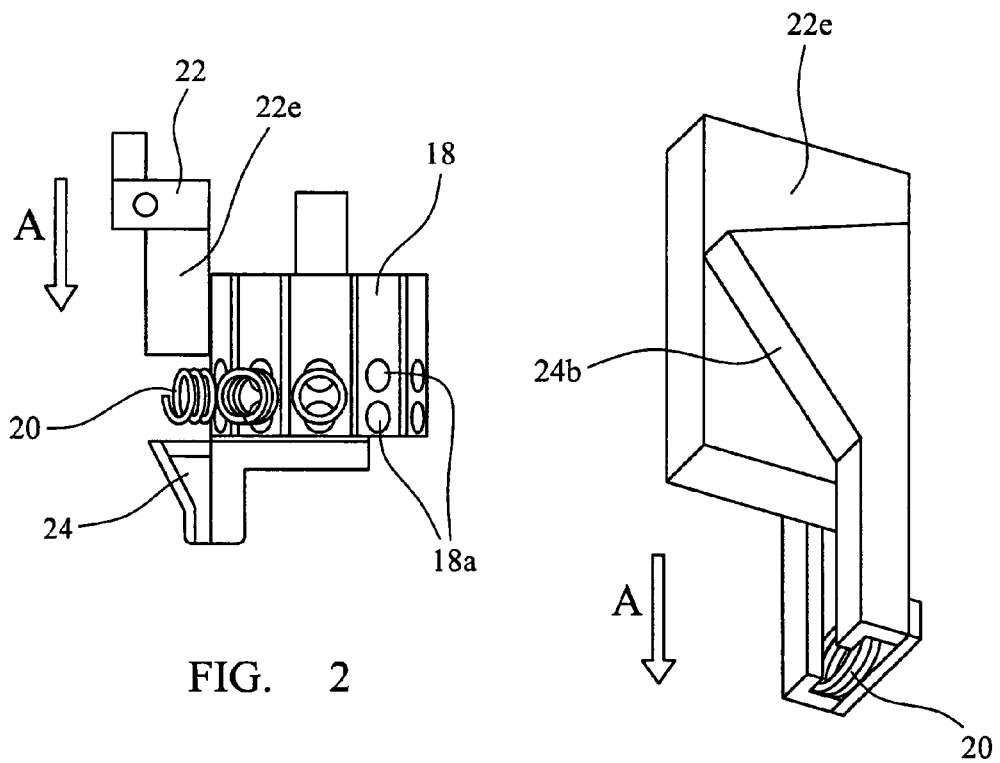
FIG. 2
FIG. 4
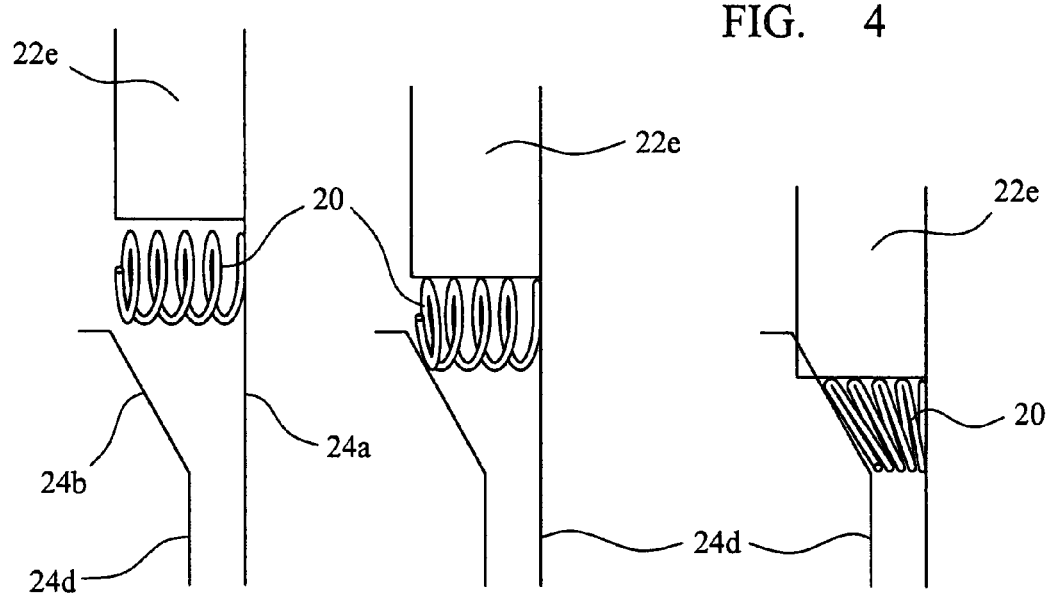
FIG. 3

APPARATUS AND METHOD FOR TRANSFERRING SPRINGS

PRIORITY INFORMATION

The present invention claims priority to International Patent Application No. PCT/GB2013/052130 filed Aug. 8, 2013, that claims priority to GB Application No. 1214314.5, filed on Aug. 10, 2012, both of which are incorporated herein by reference in their entireties.

The present invention relates to apparatus and method for transferring springs, and is concerned particularly with apparatus and a method for transferring springs from a coiling apparatus to an insertion station.

Coiled wire springs are used in many upholstered units, such as mattresses, to provide comfort. The springs may be encased in individual fabric pockets to form a pocketed spring unit. Generally, the greater the number of individual springs, the greater is the comfort afforded to the user. In higher quality mattresses this has led to the use of smaller springs which are densely arranged in an array. International patent application number WO 2007/031774 describes an example of a pocketed spring unit and a method of manufacturing the same.

The springs are made in a coiling machine and may be stored before use or may be taken from the coiler and used directly in the assembly of the pocketed spring unit. However, the transfer and placement of small wire springs presents problems due to their light weight and resilient characteristics.

Embodiments of the present invention aim to address at least partly some of the problems of handling springs in manufacturing methods of this kind.

The invention is defined in the attached independent claims, to which reference should now be made. Further, preferred features may be found in the sub-claims appended thereto.

According to the present invention there is provided apparatus for transferring springs from a spring coiling machine to a pocketing station in which the springs may be inserted into discrete pockets formed between layers of material, the apparatus comprising a movable conveying substrate having a plurality of magnets positioned thereon, at least one of the magnets being arranged to attract a spring from the coiling machine and to retain the spring on the substrate, and the substrate being arranged to convey the spring from the coiling machine to the pocketing station.

The apparatus may comprise a substantially flexible mandrel for supporting the spring prior to the spring being retained on the substrate.

The apparatus may be arranged such that the magnets are overlaid by a layer of pocketing material.

The invention also includes a method of transferring springs from a spring coiling machine to a pocketing station in which the springs may be inserted into discrete pockets formed between layers of material, the method comprising moving a conveying substrate having a plurality of magnets positioned thereon such that at least one of the magnets attracts a spring from the coiling machine and retains it on the substrate, and conveying the spring from the coiling machine to the pocketing station.

The method may comprise supporting the spring on a substantially flexible mandrel prior to retaining it on the substrate.

In a preferred arrangement the magnets are arranged in spaced pairs. Preferably the pairs of magnets are arranged such that identical poles are adjacent.

As is known in the art, a spring coiling machine may comprise a coil forming part and a cutting part, wherein the coil forming part forms a coil spring from a substantially continuous length of spring material, before the cutting part cuts the spring from the rest of the material.

In accordance with a preferred embodiment of the present invention the formed spring is arranged to be placed within a magnetic field of at least one of the magnets before the spring is cut from the length of spring material.

The invention may include any combination of the features or limitations referred to herein, except such a combination of features as are mutually exclusive.

A preferred embodiment of the present invention will now be described, by way of example only, with reference to the accompanying drawings, in which:

FIG. 2 is an end view of the apparatus of FIG. 1;

FIG. 3 show schematically successive views of a spring compression stage;

FIG. 4 shows schematically an end point of the spring compression stage;

Figure 1:
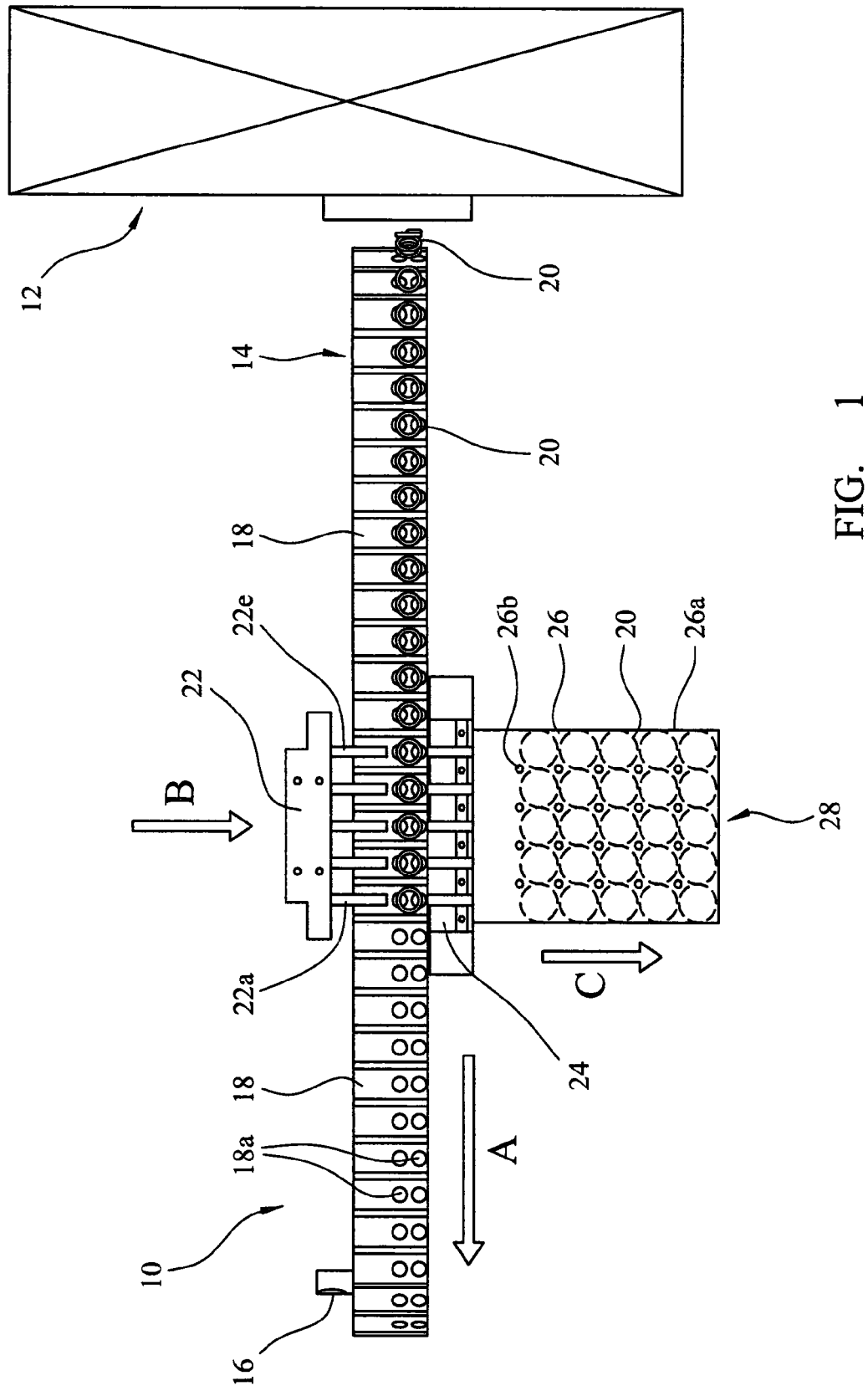
FIG. 1 is a schematic front view of a spring transfer apparatus in accordance with an embodiment of the invention.

Turning to FIG. 1, this shows, generally at 10, a spring transfer apparatus positioned adjacent a spring coiling machine 12 (shown only schematically). The transfer apparatus comprises a conveying substrate in the form of a belt 14 arranged in an endless loop and driven in a direction A by a motor 16. The belt comprises a plurality of magnetic spring holders 18 which are arranged in use to accept steel wire springs 20 from the coiling machine 12. Each of the magnetic spring holders has a pair of ferro-magnets 18a for holding the steel springs. The magnets are arranged such that identical poles are adjacent.

The apparatus is arranged such that the magnets begin to attract the formed springs before they are cut from the length of wire by the spring coiling machine.

At a pocketing station, an electrically operated ram 22, having multiple fingers 22a-22e, is arranged to push springs in a direction shown by arrow B from the spring holders through spring compression members 24 into position between layers of pocketing material 26 which are then welded together at their edges 26a and at locations 26b between the springs 20, as the material is indexed forwards in the direction shown by arrow C to form a pocketed spring unit 28. The welding and indexing apparatus is omitted for reasons of clarity, as are the supply rolls of material.

FIG. 2 is an end view of the apparatus 10 showing the ram 22. The ram finger 22e moves downwardly in the direction of arrow A to push the spring 20 from the spring holder 18, on which it has been retained magnetically by magnets 18a. As each spring is pushed off the magnets 18a it becomes driven into the spring compression member 24 before entering between the layers of pocketing material (not shown).

FIG. 3 shows in successive stages the progress of a spring through the spring compression member. The spring compression member 24 comprises a base plate 24a and a pair of inverted ramps 24b each of which has an overhang portion 24c (shown in FIG. 4). The ramps 24b are spaced apart to create a gap sufficiently wide to allow the ram finger 22e to pass between them. However gap is less than the diameter of the spring 20 and as the spring is forced through the compression member 24 it becomes compressed axially between the overhangs and the base plate. The ramps 24b lead to flat output portions 24d through which the springs are finally passed before they enter the pockets formed for them in the material (not shown).

Figure 5:
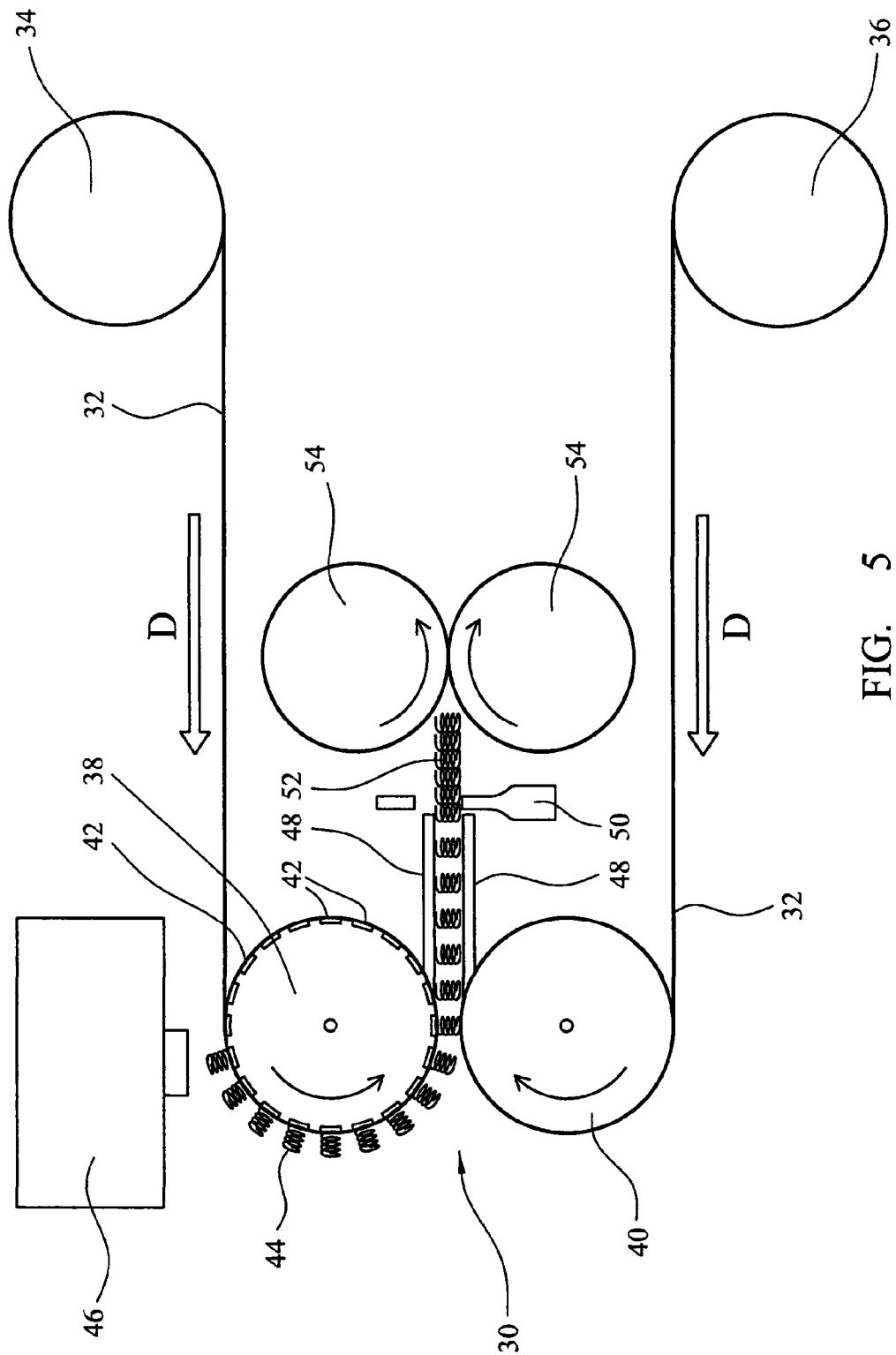
FIG. 5 shows schematically in side view an alternative embodiment of spring transfer apparatus in accordance with the invention.

FIG. 5 is an end schematic view of an alternative embodiment of spring transfer apparatus, shown generally at 30. Pocketing material 32 is supplied from rolls 34 and 36 respectively to rollers 38 and 40 in the direction of arrows D. Roller 38 comprises a plurality of pairs of ferro-magnets 42 arranged in an array across its full width and overlaid by the pocketing material 32. As roller 38 rotates in an index fashion it collects rows of springs 44 from a multiple spring coiling machine 46. Upon leaving the coiling machine the springs 44 are immediately attracted to, and retained by, the pairs of magnets 42.

As the roller 38 continues to rotate the springs meet the other roller 40 which is carrying the other layer of pocketing material 32. The rollers 38 and 40 are spaced apart slightly so as to compress the springs between the layers of material 32. The compressed springs are then fed between parallel plates 48 to a welding station 50 where the layers of material are welded together in an index fashion along their edges, and at locations between the springs, to form a pocketed spring unit 52, which is then fed to a further processing station by rollers 54.

Figure 6:
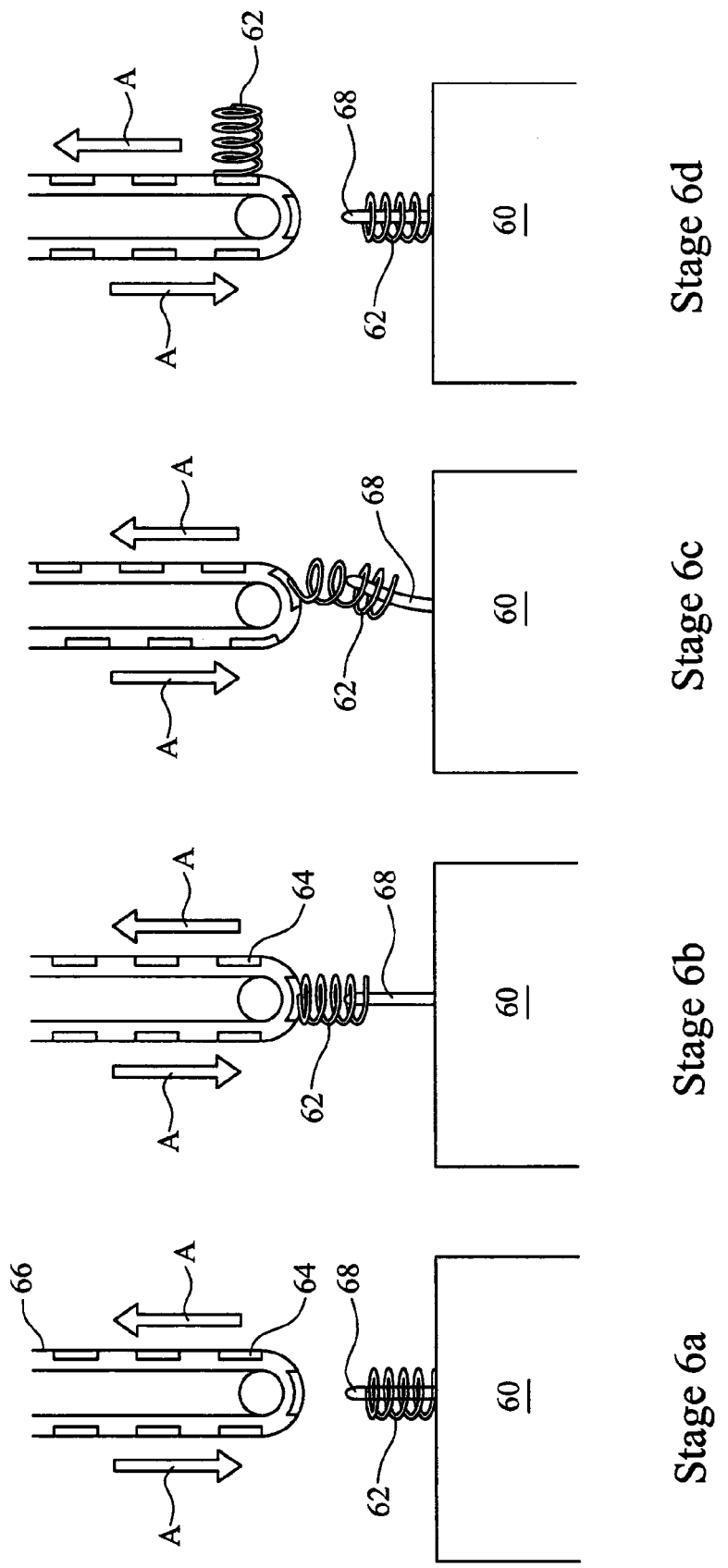
FIG. 6 shows a further embodiment of the invention in schematic plan view, in four successive stages.

Turning to FIG. 6, this shows a further embodiment of the invention in schematic plan view, in four successive stages. As with the previously described embodiments a coiler 60 coils springs 62 which come under the influence of magnets 64 on an endless belt 66, and then are cut for release onto the magnets. The belt carries the springs, which are held magnetically thereon, in the direction of arrows A to a pocketing station (not shown) which may be of the type described above.

In this embodiment, the key difference is that the coiler coils the springs onto a flexible transfer mandrel 68 which supports the springs as they become drawn away by the passing magnet 64. In the first stage 6a the spring 62 is formed on the mandrel 68 and comes under the influence of a magnetic field associated with the magnet 64. In the second stage 6b the spring is cut and is drawn towards the magnet 64. In stage 6c the mandrel flexes to allow the spring to be taken without distorting the spring. Stage 6d shows the spring clear of the mandrel which has returned to its start position, with a new spring formed thereon.

The flexible mandrel can also be useful when the spring is being formed by the coiler. During coiling the spring can be pushed sideways by the coiler, and this tendency can be accommodated by the flexing of the mandrel without deforming the spring. The mandrel returns to its undeflected position after the spring has been cut.

The apparatus and method described herein allow an efficient transfer of springs from a coiling machine into pockets of material. The magnets hold the springs reliably and precisely, which is particularly important for smaller springs and higher transfer speeds. Because of the reliable nature of the apparatus, the likelihood of mishandling of a spring, and with it the potential for processing down-time is greatly reduced.

In the embodiments described above the magnets are arranged as a pair with identical poles being adjacent. It has been found that this arrangement, in which the steel coil of the spring is attracted substantially equally to the two magnets, is conducive to the precise and reliably repeatable positioning of the springs on the conveyor. However other arrangements of magnets may be used, such as three magnets arranged in an equilateral triangle, for example.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. Apparatus for transferring springs from a spring coiling machine to a pocketing station in which the springs may be inserted into discrete pockets formed between layers of material, the apparatus comprising a movable conveying substrate having a plurality of magnets positioned thereon, at least one of the magnets being arranged to attract a spring from the coiling machine and to retain the spring on the substrate, and the substrate being arranged to convey the spring from the coiling machine to the pocketing station, wherein the formed spring is arranged to be placed within a magnetic field of at least one of the magnets before being cut from a length of spring material.

2. Apparatus according to claim 1, wherein the apparatus comprises a substantially flexible mandrel for supporting the spring prior to the spring being retained on the substrate.

3. Apparatus according to claim 1, wherein the apparatus is arranged such that the magnets are overlaid by a layer of pocketing material.

4. A method of transferring springs from a spring coiling machine to a pocketing station in which the springs may be inserted into discrete pockets formed between layers of material, the method comprising moving a conveying substrate having a plurality of magnets positioned thereon such that at least one of the magnets attracts a spring from the coiling machine and retains it on the substrate, and conveying the spring from the coiling machine to the pocketing station, wherein the method comprises supporting the spring on a substantially flexible mandrel prior to retaining it on the substrate.

5. A method according to claim 4, wherein the magnets are arranged in spaced pairs.

6. A Method according to claim 4, wherein the pairs of magnets are arranged such that identical poles are adjacent.

7. A method according to claim 4, wherein the formed spring is arranged to be placed within a magnetic field of at least one of the magnets before being cut from a length of spring material.

8. Apparatus for transferring springs from a spring coiling machine to a pocketing station in which the springs may be inserted into discrete pockets formed between layers of material, the apparatus comprising a movable conveying substrate having a plurality of magnets positioned thereon, at least one of the magnets being arranged to attract a spring from the coiling machine and to retain the spring on the substrate, and the substrate being arranged to convey the spring from the coiling machine to the pocketing station, wherein the apparatus comprises a substantially flexible mandrel for supporting the spring prior to the spring being retained on the substrate.

9. Apparatus according to claim 8, wherein the apparatus is arranged such that the magnets are overlaid by a layer of pocketing material.

10. Apparatus according to claim 9, wherein the formed spring is arranged to be placed within a magnetic field of at least one of the magnets before being cut from a length of spring material.

11. Apparatus for transferring springs from a spring coiling machine to a pocketing station in which the springs may be inserted into discrete pockets formed between layers of material, the apparatus comprising a movable conveying substrate having a plurality of magnets positioned thereon, at least one of the magnets being arranged to attract a spring from the coiling machine and to retain the spring on the substrate, and the substrate being arranged to convey the spring from the coiling machine to the pocketing station, wherein the apparatus is arranged such that the magnets are overlaid by a layer of pocketing material.

12. Apparatus according to claim 11, wherein the apparatus comprises a substantially flexible mandrel for supporting the spring prior to the spring being retained on the substrate.

13. Apparatus according to claim 11, wherein the formed spring is arranged to be placed within a magnetic field of at least one of the magnets before being cut from a length of spring material.

14. A method of transferring springs from a spring coiling machine to a pocketing station in which the springs may be inserted into discrete pockets formed between layers of material, the method comprising moving a conveying substrate having a plurality of magnets positioned thereon such that at least one of the magnets attracts a spring from the coiling machine and retains it on the substrate, and conveying the spring from the coiling machine to the pocketing station, wherein the formed spring is arranged to be placed within a magnetic field of at least one of the magnets before being cut from a length of spring material.

15. A method according to claim 14, wherein the method comprises supporting the spring on a substantially flexible mandrel prior to retaining it on the substrate.

16. A method according to claim 14, wherein the magnets are arranged in spaced pairs.

17. A Method according to claim 14, wherein the pairs of magnets are arranged such that identical poles are adjacent.

\* \* \* \* \*